US008054321B2

(12) United States Patent
Cho et al.

(10) Patent No.: US 8,054,321 B2
(45) Date of Patent: Nov. 8, 2011

(54) DISPLAY AND DRIVING METHOD THEREOF

(75) Inventors: Nam Wook Cho, Gyeonggi-do (KR); Sung Hak Jo, Gyeonggi-do (KR); Dong Woo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 743 days.

(21) Appl. No.: 11/455,724

(22) Filed: Jun. 20, 2006

(65) Prior Publication Data

US 2007/0057959 A1 Mar. 15, 2007

(30) Foreign Application Priority Data

Sep. 9, 2005 (KR) ........................ 10-2005-0084155

(51) Int. Cl.
*G09G 5/10* (2006.01)
*G09G 3/36* (2006.01)
*G06F 3/038* (2006.01)

(52) U.S. Cl. .......... 345/690; 345/204; 345/208; 345/89; 345/94

(58) Field of Classification Search .................... 345/89, 345/94, 204, 208, 690
See application file for complete search history.

(56) References Cited

U.S. PATENT DOCUMENTS

| | | | | |
|---|---|---|---|---|
| 2001/0048432 | A1* | 12/2001 | Taniai et al. | 345/213 |
| 2002/0196221 | A1* | 12/2002 | Morita | 345/87 |
| 2003/0048246 | A1* | 3/2003 | Ham | 345/87 |
| 2005/0156851 | A1* | 7/2005 | Yun | 345/98 |
| 2006/0007083 | A1* | 1/2006 | Pai et al. | 345/87 |

FOREIGN PATENT DOCUMENTS

| | | | |
|---|---|---|---|
| JP | 06222328 | A * | 8/1994 |
| JP | 09055908 | A * | 2/1997 |
| JP | 2003-005696 | | 1/2003 |
| JP | 2004-240317 | A | 8/2004 |
| JP | 2005-037899 | | 2/2005 |

* cited by examiner

*Primary Examiner* — Bipin Shalwala
*Assistant Examiner* — Ilana Spar
(74) *Attorney, Agent, or Firm* — Morgan, Lewis & Bockius LLP

(57) ABSTRACT

A display device includes a data modulator for analyzing a gray level of input data, modulating the input data in accordance with the analyzation result, and inserting one of black data and white data along with the modulated data, and a driver for supplying modulation data from the data modulator and the one of black data and white data to a display panel.

9 Claims, 11 Drawing Sheets

DISPLAY AND DRIVING METHOD THEREOF

This application claims the benefit of the Korean Patent Application No. P2005-0084155 filed on Sep. 9, 2005, which is hereby incorporated by reference in its entirety.

BACKGROUND OF THE INVENTION

1. Field of the Invention

The present invention relates to a display, and more particularly to a display device and a driving method thereof. Although the present invention is suitable for a wide scope of applications, it is particularly suitable for minimizing motion blurring and brightness deterioration in a display of motion pictures.

2. Description of the Related Art

In signal holding type display devices, such as liquid crystal display (LCD) device or an organic light emitting diode (OLED), a blurring phenomenon occurs on display screen when a motion picture is displayed. FIG. 1 is a diagram representing light emission characteristics of a cathode ray tube, FIG. 2 is a diagram representing light emission characteristics of a liquid crystal display device. The blurring phenomenon will be explained in conjunction with FIG. 1 that shows characteristics of a cathode ray tube (CRT), which is a signal impulse device and FIG. 2 that shows characteristics of an LCD device, which is a signal hold device.

As shown in FIG. 1, the CRT is a signal impulse type display device which displays data by making a phosphorus emit light for a very short time in an early stage of one field period such that most of the one frame period is a pause interval. Accordingly, a perceived image of an observer in a motion picture is clearly displayed in the CRT. In comparison, the liquid crystal display device, as shown in FIG. 2, data is supplied to a liquid crystal cell during a scanning period when a scan high voltage Vgh is supplied and then the data is maintained in the liquid crystal cell during a non-scanning period, which is most of one frame period. Thus, an incorrect perceived image of the displayed motion picture occurs because of the maintenance characteristic of the liquid crystal in the liquid crystal display device. The incorrect perceived image results is due to an integration effect of the displayed motion picture image that temporarily lasts in observer's eyes after a movement. Accordingly, even though the response speed of the liquid crystal display device is fast, an observer sees a blurred screen because of discordance between the movement detected by the eye and the static image of each frame.

FIG. 3 is a diagram representing the related art method of improving motion blurring by insertion of black data. To reduce the appearance of motion blurring in the liquid crystal display device of the related art, a method of reducing the holding time by inserting black data in a frame period has been used, as shown in FIG. 3. Thus, a method of reducing the holding time by inserting black data has characteristics similar to those of the CRT.

FIG. 4 is a diagram representing a data alignment of a normal state without inserting black data, and FIG. 5 is a diagram representing a data alignment where black data are inserted into the whole gray level area. As shown in FIG. 4, frame data is supplied to a liquid cell throughout one frame. The related art method of improving motion reduces the holding time D1~D5 of frame data within each frame and inserts black data B1~B5, as shown in FIG. 5, thereby driving a liquid crystal display device by a pseudo-impulse scheme to reduce the motion blurring phenomenon. Accordingly, as shown in FIG. 3, the gray level of the input data is provided for about 60% of each frame and the inserted black level is expressed for about 40% of each frame.

FIG. 6 is a graph of a display brightness using the normal state supplying method and the display brightness using the black data insertion supplying method. The motion blurring problem can be solved to a certain extent by the pseudo-impulse method shown in FIGS. 3 and 5. However, the data holding time D1~D5 of each frame is reduced while the black data are inserted such that the brightness BDI of the display is decreased, as shown in FIG. 6.

SUMMARY OF THE INVENTION

Accordingly, the present invention is directed to a display device and a driving method thereof that substantially obviate one or more of the problems due to limitations and disadvantages of the related art An object of the present invention to provide a display device and a driving method thereof that minimizes blurring in a display of a motion picture.

Another object of the present invention to provide a display device and a driving method thereof that prevents a deterioration of brightness in a display of a motion picture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, A display device includes a data modulator for analyzing a gray level of input data, modulating the input data in accordance with the analyzation result, and inserting one of black data and white data along with the modulated data, and a driver for supplying modulation data from the data modulator and the one of black data and white data to a display panel.

In another aspect, a driving method of a display device includes analyzing a gray level of input data to obtain an analyzation result, modulating the input data in accordance with the analyzation result, and inserting one of black data and white data along with the modulated data in accordance with the analyzation result, and displaying the modulated data and one of the black data and white data on a display panel.

In another aspect, a display device includes a data modulator for analyzing a gray level of input data to obtain an analyzation result, modulating the input data in accordance with the analyzation result, and inserting one of black data and white data after the modulated data, and a driver for supplying modulation data from the data modulator using a gamma voltage in accordance with the analyzation result followed by the one of black data and white data to a display panel within one frame period.

In another aspect, a driving method of a display device includes modulating input data to a higher level and inserting the black data after the modulated data if the gray level of the input data is less than a designated reference gray level, modulating input data to a lower level and inserting the white data after the modulated data if the gray level of the input data is not less than a designated reference gray level, converting the modulated data, one of the black data and the white data into an analog data voltage to supply to a display panel, sequentially supplying a first scan pulse synchronized with the modulated data to the display panel, displaying the modulated data on the display panel, sequentially supplying a second scan pulse synchronized with the one of the black data and the white data to the display panel, and displaying the one of the black data and the white data on the display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE PREFERRED EMBODIMENTS

Reference will now be made in detail to the preferred embodiments of the present invention, examples of which are illustrated in FIGS. 7 to 11.

Figure 1:
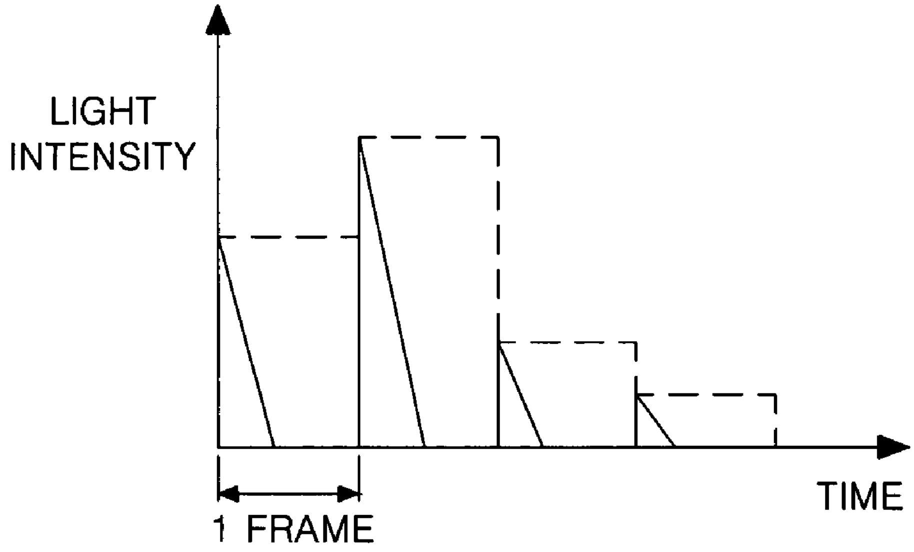
FIG. 1 RELATED ART
FIG. 1 is a diagram representing light emission characteristics of a cathode ray tube.
Figure 2:
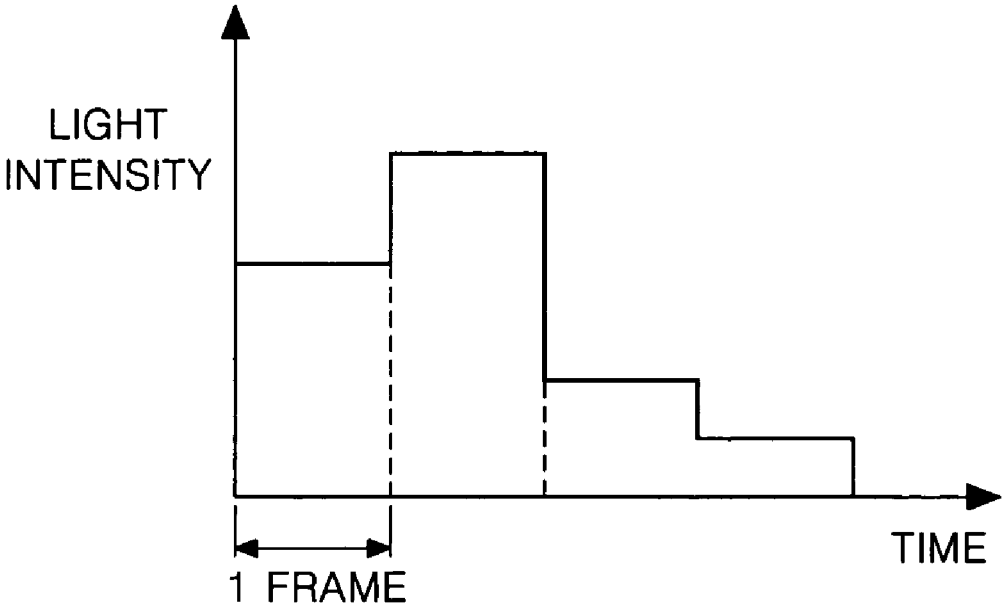
FIG.2 RELATED ART
FIG. 2 is a diagram representing light emission characteristics of a liquid crystal display device.
Figure 3:
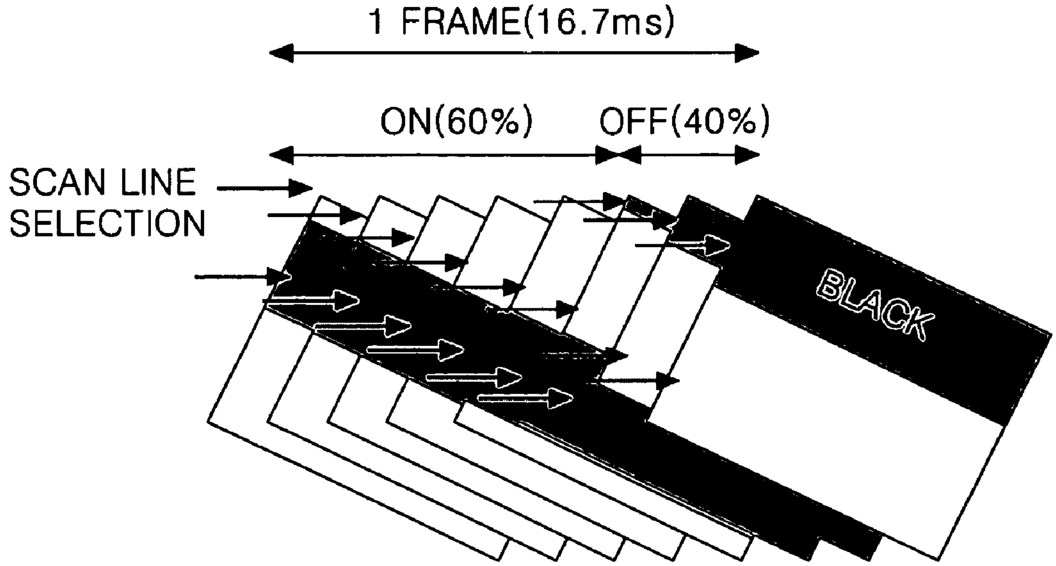
FIG.3 RELATED ART
FIG. 3 is a diagram representing a related art method of improving motion blurring by insertion of black data.
Figure 4:
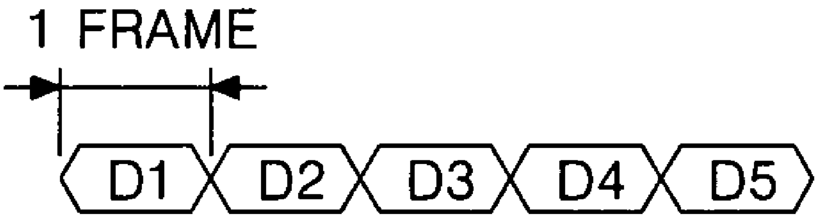
FIG. 4 RELATED ART
FIG. 4 is a diagram representing a data alignment of a normal state without inserting black data.
Figure 5:
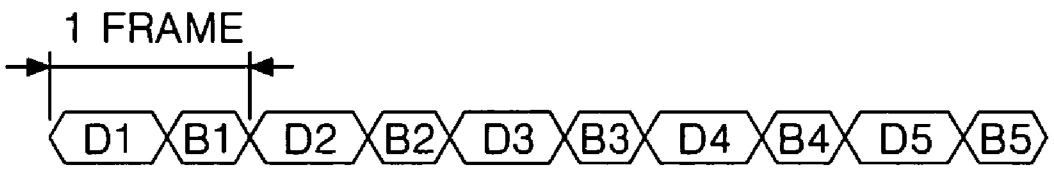
FIG. 5 RELATED ART
FIG. 5 is a diagram representing a data alignment where black data are inserted into the whole gray level area.
Figure 6:
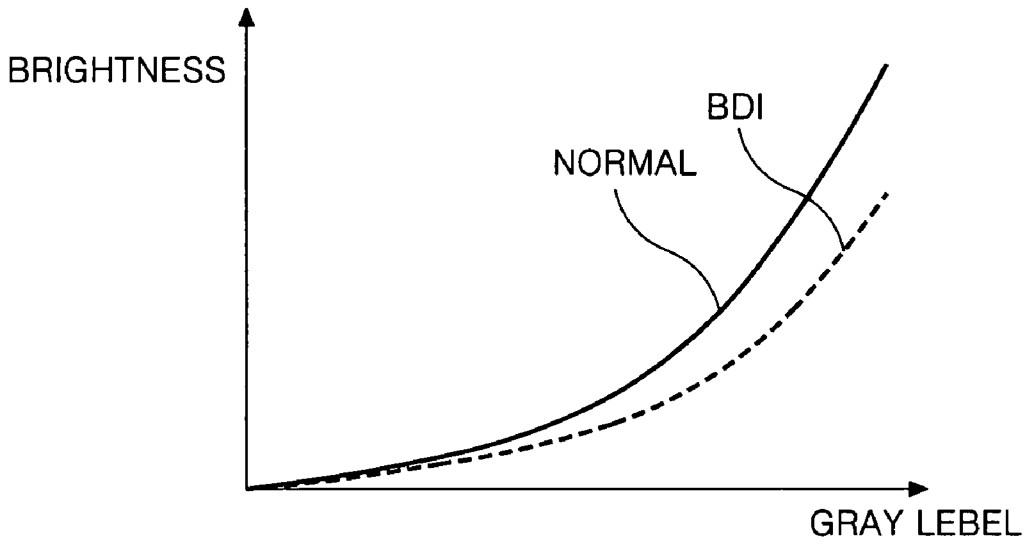
FIG. 6 RELATED ART
FIG. 6 is a graph of a display brightness using the normal state supplying method and the display brightness using the black data insertion supplying method.
Figure 7:
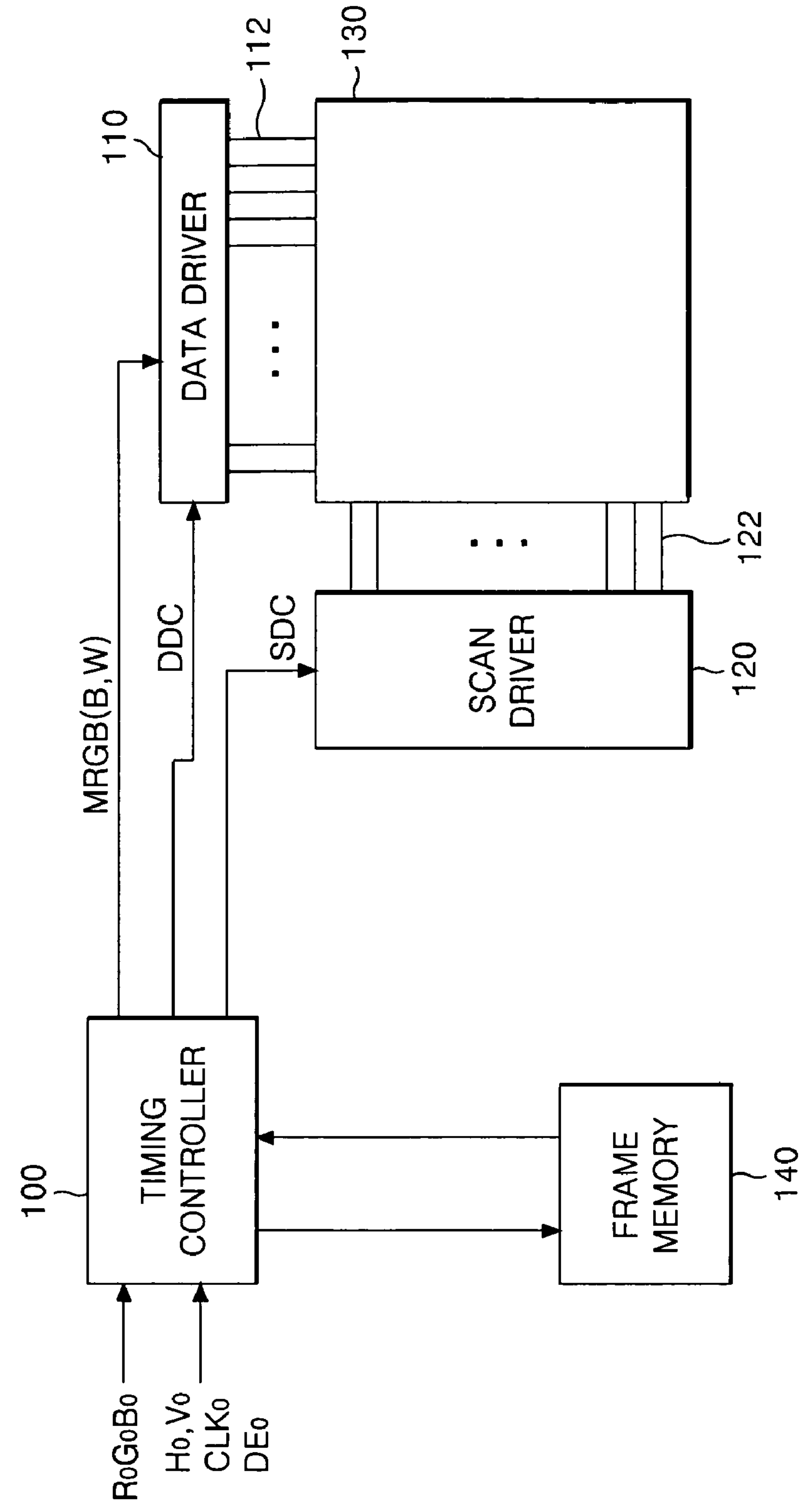
FIG. 7 is a block diagram representing an embodiment of the present invention.

FIG. 7 is a block diagram representing an embodiment of the present invention. As shown in FIG. 7, a display device according to an embodiment of the present invention includes a display panel 130 in which data lines 112 cross scan lines 122 to define a plurality of pixels; a data driver 100 for supplying data to the data lines 112 of the display panel 130; a scan driver 120 for supplying scan pulses to the scan lines 122 of the display panel 130; a timing controller 110 that modulates input data and controls the data driver 110 and the scan driver 120 in accordance with modulation data; and a frame memory 140 for delaying the video data supplied to the timing controller 100 for one frame. In the display panel 130, the pixels are arranged in a matrix type. The display panel 130 is a signal holding type display device, such an LCD panel or an OLED panel.

Figure 8:
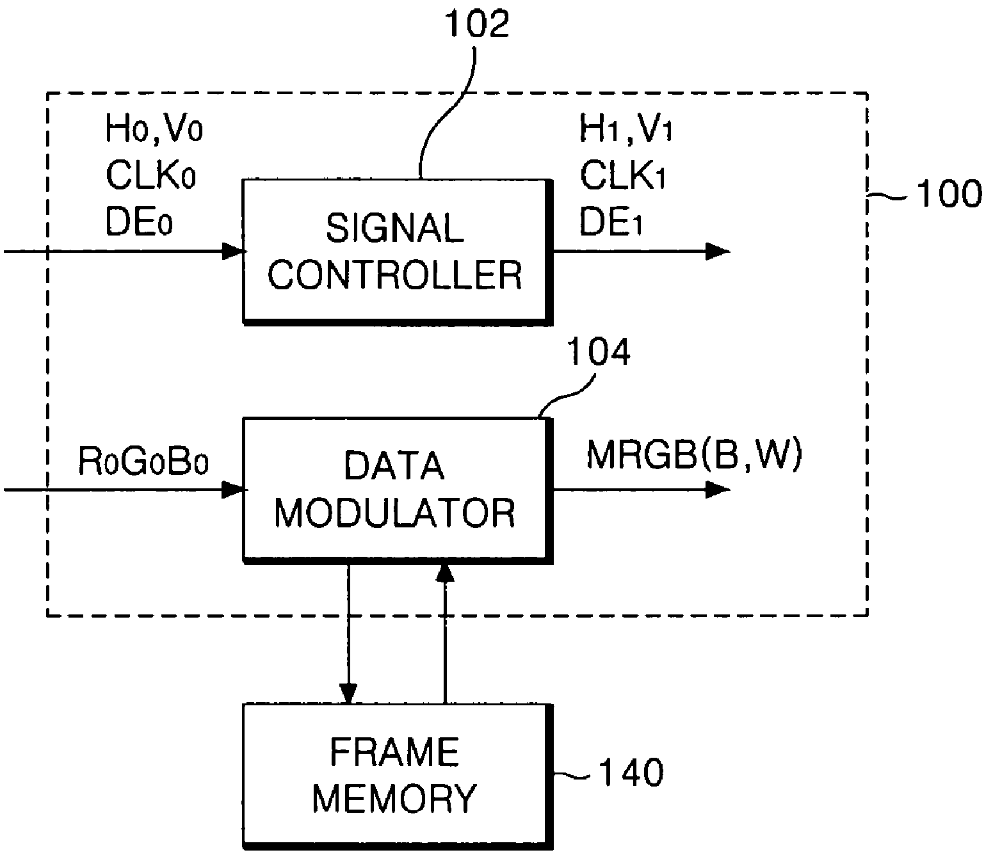
FIG. 8 is a block diagram of a timing controller shown in FIG. 7.

FIG. 8 is a block diagram of a timing controller shown in FIG. 7. The timing controller 100 includes a signal controller 102 for controlling input signals Ho, Vo, CLKo, DEo; and a data modulator 104 for modulating input data RoGoBo. The signal controller 102 generates a second vertical/horizontal synchronization signal V1, H1, a second clock signal CLK1 and a first data enable signal DE1 which are synchronized with the modulation data MRGB(B,W) by use of a first vertical/horizontal synchronization signal V0, H0, a first clock signal CLK0 and a second data enable signal DE0, which are input signals from a system. Herein, the second vertical/horizontal synchronization signal V1, H1, the second clock signal CLK1 and the second data enable signal DE1 are modulation signals V1, H1, CLK1 for driving the data driver 110 and the scan driver 120 is twice (120 Hz) as fast as the related art. Further, the signal controller 102 acts to delay the second vertical/horizontal synchronization signal V1, H1, the second clock signal CLK1 and the second data enable signal DE1, which are modulated for one frame, for a fixed period to synchronized them the modulation data MRGB(B,W).

The data modulator 104 includes a lookup table for modulating the input data RoGoBo. The data modulator 104 compares the input data RoGoBo with a reference value and selects the modulation data MRGB(B,W) corresponding to the comparison result in the lookup table, and then supplies the selected modulation data MRGB(B,W) to the data driver 110. More specifically, embodiments of the present invention drives the data driver 110 and the scan driver 120 at a speed twice as fast as the related art, reduces a data holding time of one frame of the related art, and inserts black data or white data for the remaining period of the one frame. Accordingly, modulated image data MRGB, which is made by modulating the input data RoGoBo, and the black or white data (B,W) are both displayed during the one frame period.

The high modulated image data MRGB-H, which is higher than the input data RoGoBo, are supplied if the input data RoGoBo are not greater than a reference gray level, and the low modulated image data MRGB-L, which is lower than the input data RoGoBo are supplied if the input data RoGoBo are not less than the reference gray level. Further, the black data (B) or white data (W) are inserted along with the modulated image data MRGB. More specifically, the black data (B) is inserted after the high modulated image data MRGB-H if the input data RoGoBo are not greater than the reference gray level, and the white data (W) are inserted along with the low modulated image data MRGB-L if the input data RoGoBo are not less than the reference gray level.

Figure 9:
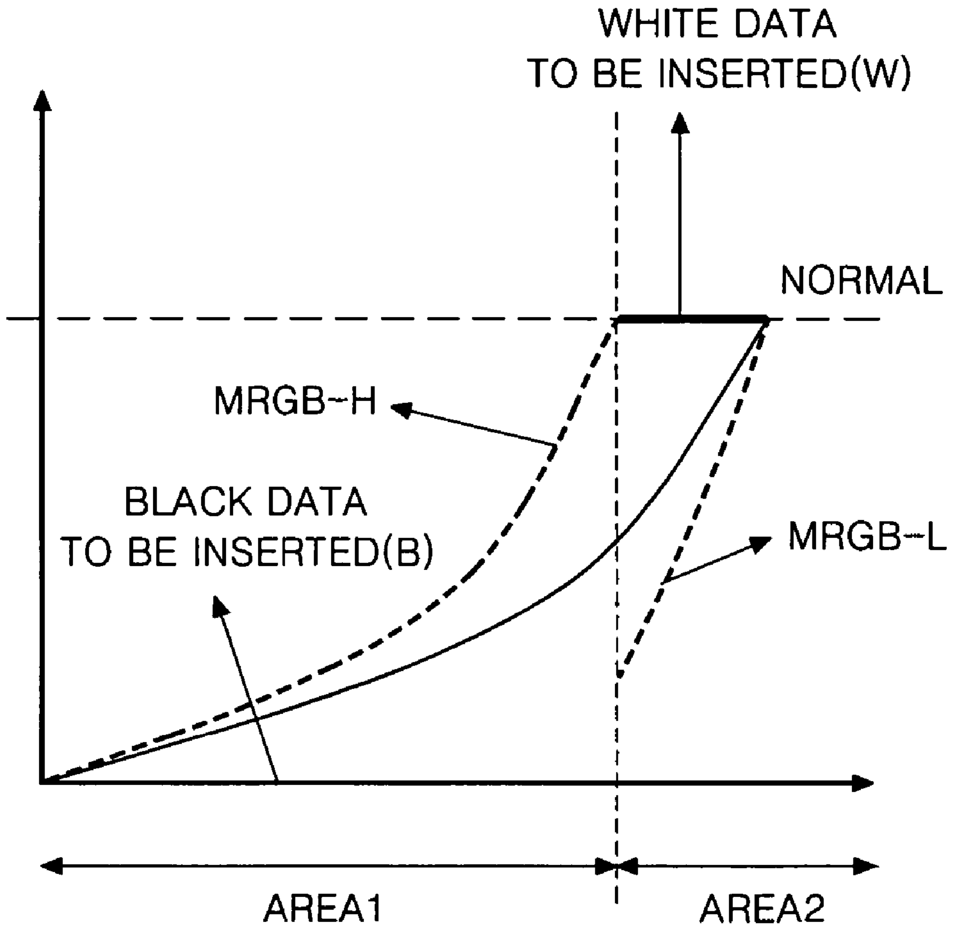
FIG. 9 is a graph showing a brightness difference between a data supplying method of the normal state and a modulated data supplying method according to an embodiment of the present invention.

FIG. 9 is a graph showing a brightness difference between a data supplying method of the normal state and a modulated data supplying method according to an embodiment of the present invention. The reference gray level, as shown in FIG. 9, is a gray level value between a first gray level area (AREA1 of FIG. 9), which is often used in motion picture realization and where a picture realization frequency is relatively high, and a second gray level area (AREA2 of FIG. 9), which is less affected by the motion blurring because the frequency is relative low. A designated reference gray level value is a gray level value between the highest brightness that appears in the method of inserting the black data (B) of the related art and a brightness higher than the highest brightness that appears in the method of inserting the black data (B) of the related art. This gray level value can be determined by doing an experiment on the brightness and motion blurring while inserting the black data (B) along with the modulated image data in each gray level and by doing an experiment of motion blurring in a normal state where the black data (B) are not inserted.

The timing controller 100 having such a configuration generates a scan control signal SDC for controlling the scan driver 120 and a data control signal DDC for controlling the data driver 110 using the modulated vertical/horizontal synchronization signals V1, H1 and the pixel clock CLK1. The timing controller 100 samples the modulation data MRGB(B, W) in accordance with the modulated pixel clock CLK1 and supplies the modulating data MRGB(B,W) to the data driver 110. The frame memory 140 stores $(n+1)^{th}$ frame input data while $n^{th}$ frame input data are modulated in the data modulator 104, and supplies the $(n+1)^{th}$ frame input data to the data modulator 104 after $(n+1)^{th}$ frame input data are modulated. The data driver 110 includes a shift register (not shown) for storing the modulation data MRGB(B,W) from the timing controller 100; a latch (not shown) that stores the modulation data MRGB(B,W) line by line in response to the clock signal from the shift register and simultaneously outputs the stored modulation data MRGB(B,W) of one line portion; a digital/analog converter (not shown) for selecting an analog positive/negative gamma compensation voltage in correspondence to the value of the modulation data MRGB(B,W) from the latch; a multiplexer (not shown) for selecting the data line 112 to which the positive/negative gamma compensation voltage is supplied; and an output buffer (not shown) that is connected between the multiplexer and the data line 112. The gamma voltage supplied to the digital/analog converter of the data driver 110 is set to be a voltage value corresponding to the modulation data MRGB(B,W)-H in a state that the black data (B) are inserted in the first gray level area (AREA1 of FIG. 9) not greater than the designated reference gray level, and is set to be a voltage value corresponding to the modulation data MRGB(B,W)-L in a state that the white data (W) are inserted in the gray level area (AREA2 of FIG. 9) of not less than the reference gray level. The data driver 110 receives the modulating data MRGB(B,W)-L,H and supplies the modulation data MRGB(B,W)-L,H to the data lines 112 of the display panel 130 under control of the timing controller 100. The modulated image data MRGB-L,H and the black or white data B,W are displayed in the same one frame period.

Figure 10:
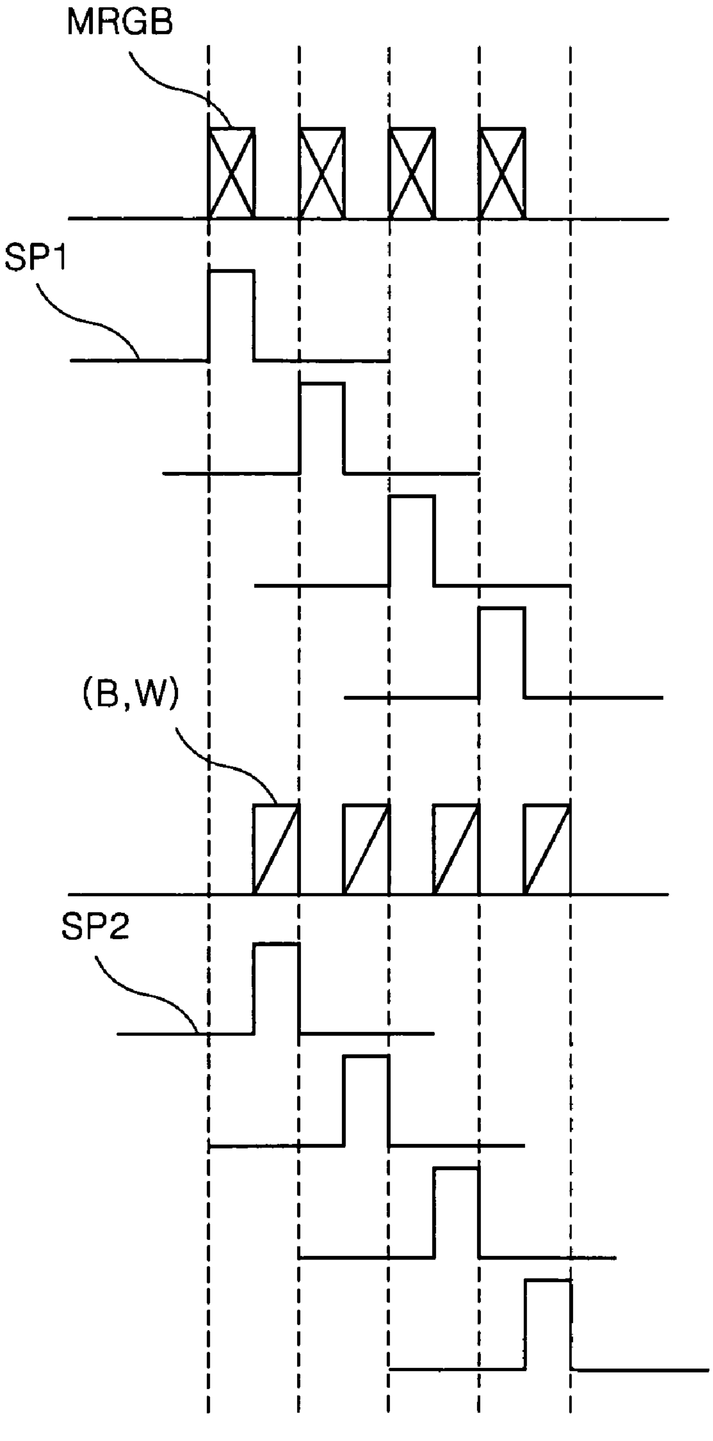
FIG. 10 is a waveform diagram representing scan pulses synchronized with modulation data.

FIG. 10 is a waveform diagram representing scan pulses synchronized with modulation data. The scan driver 110 sequentially generates a scan pulse in response to the scan control signal SDC from the timing controller 100. For example, the scan driver 110 can be driven at a speed twice as fast as one frame period such that a first scan pulse SP1 synchronized with the modulation image data MRGB and a second scan pulse SP2 synchronized with the subsequent black data (B) or white data (W) is generated, as shown in FIG. 10.

Figure 11:
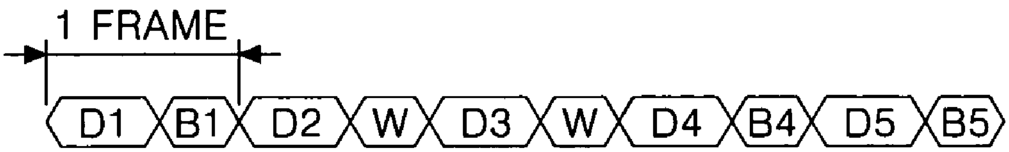
FIG. 11 is a diagram representing an example of the modulation data shown in FIG. 8.

FIG. 10 is a waveform diagram representing scan pulses synchronized with modulation data and a subsequent one of black data (B) or white data (W). Referring to FIGS. 9 and 11, in the timing controller 100, the input data not greater than the reference gray level are modulated to the modulated image data D1,D4,D5 that show higher gray levels than the input data, and the black data B1,B4,B5 are inserted after each of the modulated image data D1,D4,D5. In contrast, the input data less than the reference gray level are modulated to the modulated image data D2,D3 that show lower gray levels than the input data, and the white data W are inserted after each of the modulated image data D2,D3. The whole brightness of the modulated image data MRGB along with one of the black data (B) and the white data (W) substantially becomes similar to a display using normal data.

In this way, the display device and the driving method thereof according to the present invention insert the black data (B) in the gray level area which is sensitive to the motion blurring to minimize the blurring, and the brightness deterioration by the insertion of the black data (B) can be compensated for by modulating the input data to a higher gray level. At the same time, in the gray level area which is less sensitive to the motion blurring, the motion blurring is minimized by modulating the input data to a lower gray level, and the brightness decreased by the input data being modulated to the lower gray levels can be compensated for by inserting the white data (W).

As described above, the display device and the driving method thereof according to embodiments of the present invention analyzes the gray level of the input data in a a signal holding type display device, modulates the input data in accordance with the analyzation result, and inserts one of the black data and the white data along with the modulated data. Accordingly, the motion blurring phenomenon and the brightness deterioration can be minimized.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A display device, comprising:

a data modulator for:

comparing a gray level of input data with a designated reference gray level to obtain a comparison result;

modulating the input data in accordance with the comparison result to obtain a modulated data; and inserting one of black data and white data after the modulated data; and a driver for supplying the modulated data from the data modulator and the one of black data and white data to a display panel, wherein the data modulator:

modulates the input data to a higher level and inserts the black data after the modulated data if the gray level of the input data is less than the designated reference gray level, and modulates the input data to a lower level and inserts the white data after the modulated data if the gray level of the input data is greater than or equal to the designated reference gray level, wherein the data modulator includes a lookup table which selects one of pre-set modulation data in accordance with a gray level analysis result of the input data, and wherein the modulated data, which is made by modulating the input data and the one of black and white data are both displayed during a single frame period.

2. The display device according to claim 1, wherein the driver further comprises:

a data driver which converts the data modulated by the data modulator into an analog data voltage to supply to data lines of the display panel;

a scan driver which sequentially supplies a first scan pulse that is synchronized with the modulated input data to scan lines which cross the data lines and sequentially supplies a second scan pulse that is synchronized with the black data or the white data; and a timing controller for controlling the scan driver and the data driver, wherein the data driver and the scan driver are driven at double speed to reduce a data holding time of the one frame and inserts the black data or the white data for the remaining period of the one frame, and wherein the data driver for supplying modulation data from the data modulator uses a gamma voltage in accordance with the analysis result.

3. A driving method of a display device, comprising:
comparing a gray level of input data with a designated reference gray level to obtain a comparison result;
modulating the input data in accordance with the comparison result to obtain a modulated data;
inserting one of black data and white data after the modulated data in accordance with the comparison result; and
displaying the modulated data and one of the black data and white data on a display panel,
wherein the modulating the data and inserting one of the black data and white data includes:
modulating the input data to a higher level and inserting the black data after the modulated data if the gray level of the input data is less than the designated reference gray level, and
modulating the input data to a lower level and inserting the white data after the modulated data if the gray level of the input data is greater than or equal to the designated reference gray level, and
wherein the modulated data, which is made by modulating the input data the one of black and white data are both displayed during a single frame period.

4. The driving method according to claim 3, wherein modulating the input data comprises:
selecting one of pre-set modulation data in accordance with a gray level analysis result of the input data.

5. The driving method according to claim 3, wherein the displaying the modulated data and one of the black data and white data on a display panel comprises:
converting the modulated data, the black data and the white data into an analog data voltage to supply to the display panel;
sequentially supplying a first scan pulse, synchronized with the modulated data, to the display panel; and
sequentially supplying a second scan pulse, synchronized with the one of the black data and the white data, to the display panel.

6. A display device, comprising:
a data modulator for:
comparing a gray level of input data with a designated reference gray level to obtain a comparison result;
modulating the input data in accordance with the comparison result to obtain a modulated data; and
inserting one of black data and white data after the modulated data; and
a driver for supplying the modulated data from the data modulator using a gamma voltage including the black data and the white data set in accordance with the comparison result followed by the one of black data and white data to a display panel within one frame period,
wherein the data modulator:
modulates the input data to a higher level and inserts the black data after the modulated data if the gray level of the input data is less than the designated reference gray level, and
modulates the input data to a lower level and inserts the white data after the modulated data if the gray level of the input data is greater than or equal to the designated reference gray level,
wherein the data modulator includes a lookup table which selects one of pre-set modulation data in accordance with a gray level analysis result of the input data, and
wherein the modulated data is made by modulating the input data the one of black and white data are both displayed during a single frame period.

7. The display device according to claim 6, wherein the driver further comprises:
a data driver which converts the modulated data modulated by the data modulator into an analog data voltage to supply to data lines of the display panel;
a scan driver which sequentially supplies a first scan pulse that is synchronized with the modulated input data to scan lines which cross the data lines and sequentially supplies a second scan pulse that is synchronized with the black data or the white data; and
a timing controller for controlling the scan driver and the data driver,
wherein the data driver and the scan driver is driven at double speed to reduce a data holding time of the one frame and inserts the black data or the white data for the remaining period of the one frame, and
wherein the data driver for supplying modulation data from the data modulator uses a gamma voltage in accordance with the analysis result.

8. A driving method of a display device, comprising:
modulating input data to a higher level and inserting a black data after the modulated data if a gray level of the input data is less than a designated reference gray level;
modulating input data to a lower level and inserting a white data after the modulated data if the gray level of the input data is greater than or equal to the designated reference gray level;
converting the modulated data into an analog data voltage to supply to a display panel;
sequentially supplying a first scan pulse synchronized with the modulated data to the display panel;
displaying the modulated data on the display panel;
sequentially supplying a second scan pulse synchronized with the one of the black data and the white data to the display panel; and
displaying the one of the black data and the white data on the display panel,
wherein the modulated data which is made by modulating the input data, and the one of black and white data are both displayed during a single frame period.

9. The driving method according to claim 8, wherein the modulating the input data comprises:
selecting one of pre-set modulation data in accordance with a gray level analysis result of the input data.

* * * * *